(12) United States Patent
Xu et al.

(10) Patent No.: US 8,065,610 B2
(45) Date of Patent: *Nov. 22, 2011

(54) ASYNCHRONOUSLY RENDERING DYNAMICALLY CREATED CONTENT ACROSS MULTIPLE NETWORK DOMAINS

(75) Inventors: Sichun Xu, Mountain View, CA (US); Victor Miksonov, San Jose, CA (US)

(73) Assignee: eBay Inc., San Jose, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 12/397,228

(22) Filed: Mar. 3, 2009

(65) Prior Publication Data

US 2009/0204886 A1 Aug. 13, 2009

Related U.S. Application Data

(63) Continuation of application No. 11/394,912, filed on Mar. 31, 2006, now Pat. No. 7,506,248.

(60) Provisional application No. 60/726,870, filed on Oct. 14, 2005.

(51) Int. Cl.
G06F 17/00 (2006.01)

(52) U.S. Cl. ........................................................ 715/240

(58) Field of Classification Search .................. 715/240, 715/243; 717/115, 162, 166
See application file for complete search history.

(56) References Cited

U.S. PATENT DOCUMENTS

| | | | |
|---|---|---|---|
| 6,418,462 B1 | 7/2002 | Xu | |
| 6,493,000 B1 * | 12/2002 | Wynn et al. | ............ 715/733 |
| 7,000,180 B2 | 2/2006 | Balthaser | |
| 7,075,951 B1 | 7/2006 | McClary | |
| 7,506,248 B2 | 3/2009 | Xu et al. | |
| 2004/0015565 A1 * | 1/2004 | Bednar et al. | ............ 709/219 |
| 2006/0229896 A1 | 10/2006 | Rosen et al. | |
| 2007/0101258 A1 | 5/2007 | Xu et al. | |

FOREIGN PATENT DOCUMENTS

| | | |
|---|---|---|
| WO | WO-2007047765 A2 | 4/2007 |
| WO | WO-2007047765 A3 | 4/2007 |

OTHER PUBLICATIONS

Murray, G., "Asynchronous JavaScript Technology and XML (AJAX) with Java 2 Platform Enterprise Edition", downloaded from the Internet, http://java.sun.com/developer/technicalArticles/J2JEE/AJAX, Jun. 9, 2005, pp. 1-10.*

Bawany, A., "AJAX Instant Tutorial", downloaded from the Internet, http://aleembawany.com/2005/09/01/ajax-instant-tutorial, Sep. 1, 2005, pp. 1-11.*

(Continued)

*Primary Examiner* — Laurie Ries
(74) *Attorney, Agent, or Firm* — Schwegman, Lundberg & Woessner, P.A.

(57) ABSTRACT

A method includes loading a first document from a first document domain and rendering the first document to create a rendition. The first document includes a first instruction to dynamically create a second document object and a second instruction to write script loading logic into the second document object. The rendering includes creating the second document object according to the first instruction, writing the script loading logic into the second document object according to the second instruction, and asynchronously rendering the second document object.

17 Claims, 10 Drawing Sheets

OTHER PUBLICATIONS

U.S. Appl. No. 11/394,912, Non-Final Office Action mailed Jun. 6, 2008, 14 pgs.

U.S. Appl. No. 11/394,912, Notice of Allowance Mailed on Nov. 5, 2008, 5 pgs.

U.S. Appl. No. 11/394,912 Response filed Sep. 5, 2008 to Non-Final Office Action mailed Jun. 6, 2008, 19 pgs.

"HTTP Asynchronous Client Notifications", *Technical White Paper by Clipcode.com*, Downloaded from the internet: http://www.clipcode.org/messaginghttp_asynch_notif.html, (Sep. 21, 2005), 1-9 pgs.

"HTTP Asynchronous Client Notifications", *Technical White Paper by Clipcode.com*, http://www,.clipcode.org/messaging/http_asynch_notif.html, (Sep. 21, 2005), 1-9 pgs.

International Application Serial No. PCT/US2006/040722, Search Report and Written Opinion mailed Jul. 18, 2008, 12 pgs.

International Application Serial No. PCT/US2006/040722, Written Opinion mailed Jul. 18, 2008, 5 pgs.

Bawany, A., "AJAX: Instant Tutorial", downloaded from the internet: http://aleembawany.com/2005/09/01/ajax-instant-tutorial, (Sep. 1, 2005), 1-11 pgs.

Bawany, A., "AJAX: Instant Tutorial", http://aleembawany.com/2005/09/01/ajax-instant-tutorial/, (Sep. 1, 2005), 1-11 pgs.

Garett, J. J, "AJAX: A New Approach to Web Applications", *Adaptive Path,LLC*, downloaded from the internet: http://www.adaptivepath.com/publications/essays/archives/000385.php, (Feb. 18, 2005) 1-5 pgs.

Garrett, J. J, "AJAX: A New Approach to Web Applications", *Adaptive Path, LLC*, http://www.adaptivepath.com/publications/essays/archive/000385.php, (Feb. 18, 2005), 1-5 pgs.

Murray, G., "Asynchronous JavaScript Technology and XML (AJAX) with Java 2 platform", *Enterprise Edition*, http://java.sun.com/developer/technical/Articles/J2EE/AJAX, (Jun. 9, 2005), 1-10 pgs.

Murray, G., "Asynchronous JavaScript Technology and XML(AJAX) with Java 2 Platform, Enterprise Edition", downloaded from the interrnet: http://java.sun.com/developer/technical Articles/J2JEE/AJAX, (Jun. 9,2005), 1-10 pgs.

\* cited by examiner

ASYNCHRONOUSLY RENDERING DYNAMICALLY CREATED CONTENT ACROSS MULTIPLE NETWORK DOMAINS

RELATED APPLICATION

This application is a continuation of prior U.S. application Ser. No. 11/394,912 filed Mar. 31, 2006 now U.S. Pat. No. 7,506,248, which claims the benefit of U.S. Provisional Application Ser. No. 60/726,870 filed Oct. 14, 2005, the applications of which are incorporated herein by reference.

TECHNICAL FIELD

The present disclosure relates to a method for asynchronously loading dynamically generated content across multiple network (e.g., Internet) domains and combining the content to form the web page.

BACKGROUND

Standard Web technology allows loading of a piece of executable script from multiple domains synchronously. For example, a first document, such as the web page
   http://www.abc.com/main.html
is allowed to include a piece of JavaScript from
   http://srv.main.abcrtm.com/dynamic
The loaded JavaScript will be executed in the context of the first, in some examples main, HyperText Markup Language (HTML) document and is allowed to freely modify the main.html document. The capability of loading script from multiple domains is generally considered safe.

The loading of the executable script is synchronous. It means, once the loading of JavaScript starts, the rendering of the main.html document is blocked until the "dynamic" script is loaded and executed. After the script is executed, the main document continues to render until finished.

The synchronous behavior of script loading introduces two problems. First, if the script is large, it will block the rendering of the entire (e.g., a composite—the first document augmented with the executable script) document for an extended period of time. This degrades end user experience. Second, the script is considered by a document compositing device, which may be a web browser running on a personal computer or laptop computer, as a part of the document and cannot be loaded on-demand in response to a user action.

In recent years, a technology called AJAX (Asynchronous JavaScript and XML) emerged. This technology allows loading of dynamically generated content asynchronously and on-demand. For example, a piece of dynamically generated HTML content or XML document can be loaded in response to a user action. This technology, if applied properly, can improve the responsiveness of web applications and enhance the end user experience. However, loading of HTML or XML content across multiple domains is not considered safe. If it is allowed, a malicious web site can easily hijack pages on other web sites.

AJAX technology as a matter of principle blocks the interaction between the main document and dynamically loaded content coming from a different domain. This restriction can be relaxed slightly by downgrading the domain attribute of a document to its second level root domain. For example, a document on www.abc.com can be downgraded to domain abc.com; while a document on svc.main.abcrtm.com can be downgraded to ebayrtm.com. If the main document and the dynamic content (e.g. HTML or XML content) share the same second level root domain after the downgrading, they are allowed to communicate with each other.

However, if the dynamic content is on a different second level root domain, it is strictly not allowed to access the main document. For example, a main.html document can be downgraded to domain abc.com. If the content is coming from another second level root domain such as abcrtm.com, it is not allowed to access (e.g., read/modify) the main.html document at all.

For more detailed description for this restriction, please refer to the Microsoft technical document located at:
   http://msdn.microsoft.com/workshop/author/om/xframe_scripting_security.asp However, a single web content provider, such as an Internet company can own multiple domains. For example, ebay owns www.ebay.com, www.paypal.com, www.shopping.com etc. All contents within those domains are considered safe within ebay. There is a need to safely retrieve content from multiple domains and combine or compose them together asynchronously to form the final rendition—which may be the visible depiction of the web page.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an example embodiment. It will be evident, however, to one skilled in the art that the present application may be practiced without these specific details.

Figure 1:
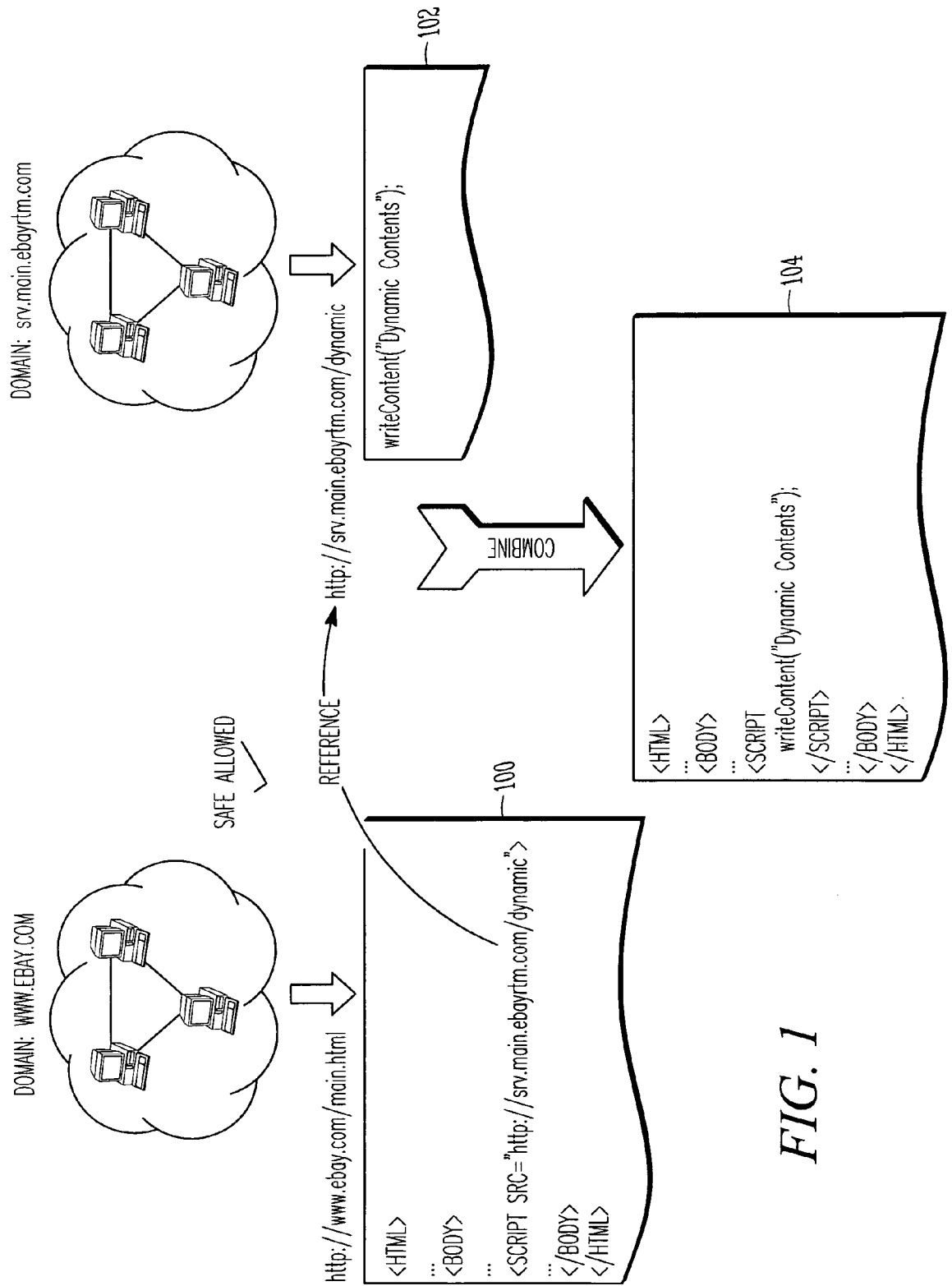
FIG. 1 is a diagrammatic illustration of how Web technology allows loading of a piece of executable script across multiple domains synchronously.

Web technology allows loading of a piece of executable script across multiple domains synchronously. An example is shown in FIG. 1. In this example, one document "main.html" 100 is located on the web site www.ebay.com. A second document "dynamic" 102 is located on srv.main.ebayrtm.com. It is allowed for the "main.html" document 100 to load and execute the "dynamic" script, and the "dynamic" script can freely modify the "main.html" document even though the "dynamic" script is coming from a different domain.

In this example, there is no iframe element in the code of the main or first document. A document compositing device, such as a web browser may execute this in the following sequence: (1) the first document 102 ("main.html" in this example) is loaded from a script serving domain, (2) the first document is rendered, (3) during this rendering process the line "<Script src=...>" is rendered, causing the rendering of the first document to pause while the script of the second document (or sub document) object is loaded, (4) the second document object is rendered, during which rendering the "writeContent" call is made, thus modifying the rendition of the first document, and (5) the rendition of the main document resumes from the point at which it was paused to load the script into the main document. The final rendition of the main document 104 in this example includes the content of the main document, as modified by the sub document script. It will be apparent that, depending on the content of the script in the second document, this modification could be small such as, for example, simple style changes, or large, such as, for example a replacement of the entire first document content.

Figure 2:
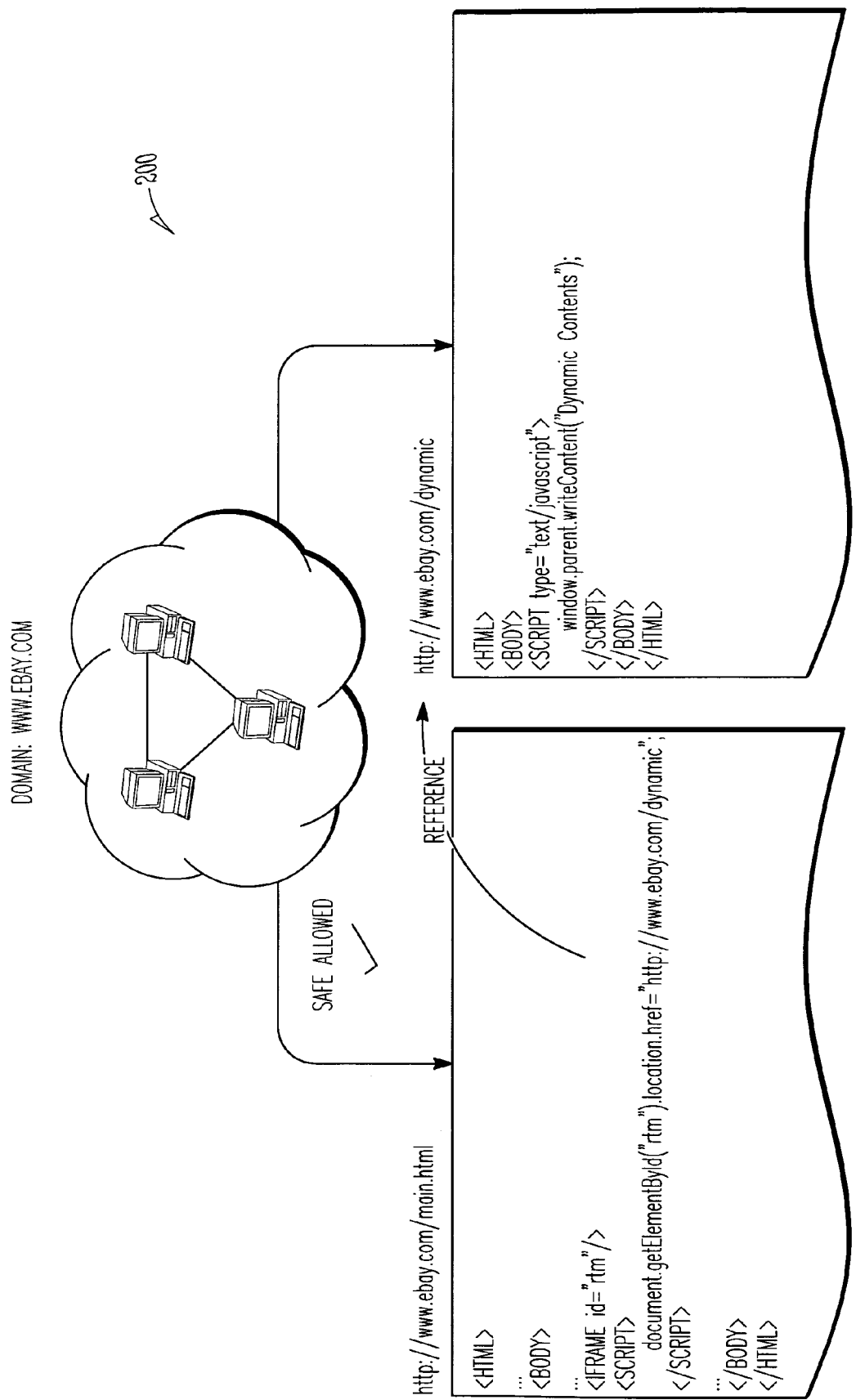
FIG. 2 is a diagrammatic representation of how AJAX technology allows loading of dynamic contents asynchronously.
Figure 3:
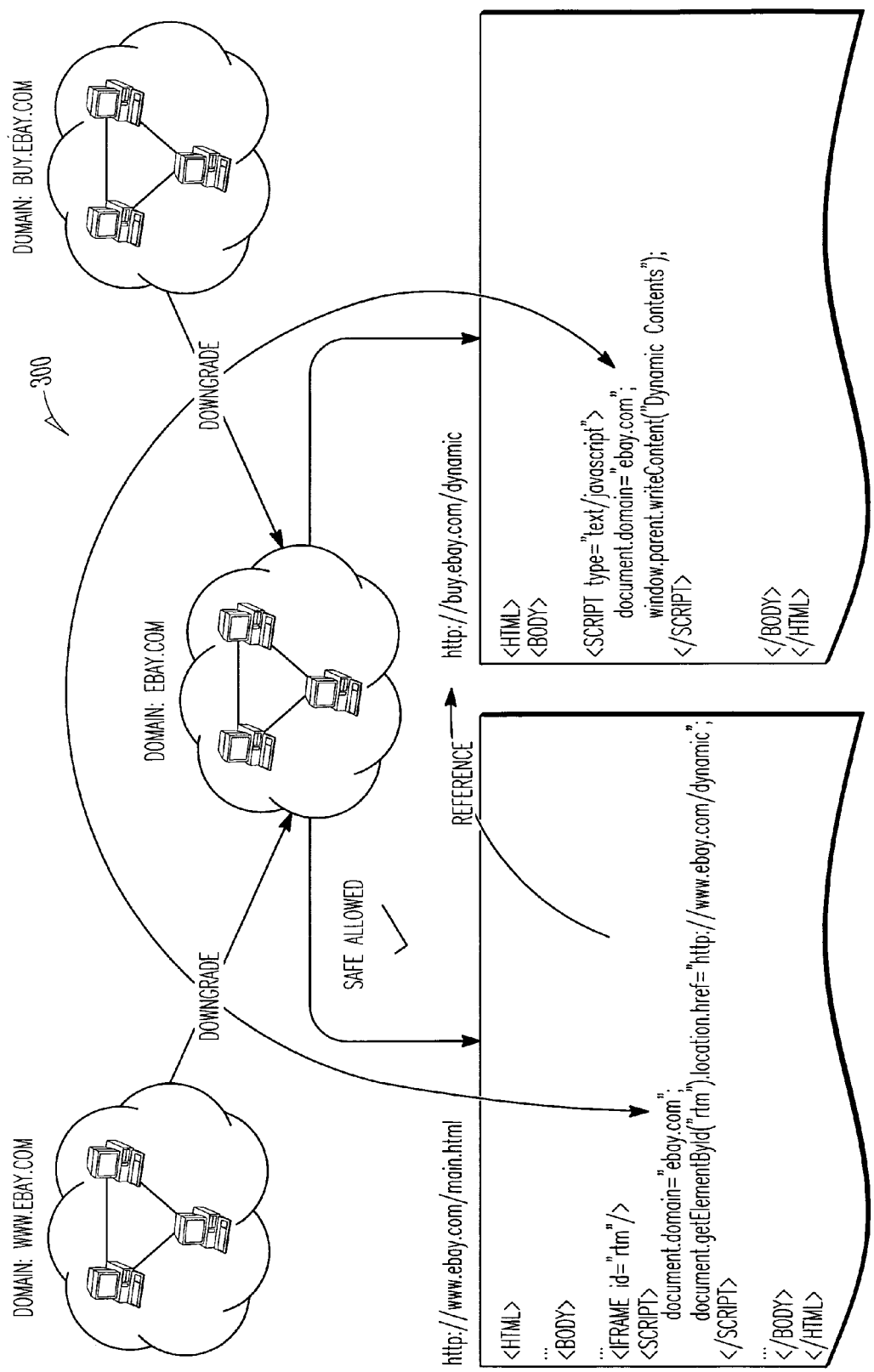
FIG. 3 is a diagrammatic representation of downgrading a domain attribute of a main document to a second level root domain.

AJAX technology allows loading of dynamic contents asynchronously. An example is shown at 200 in FIG. 2. An advanced AJAX technique supported by modern browsers allows loading of dynamic content from multiple domains. However they must share the same second level root domain (e.g., "www.ebay.com") of a top-level domain (e.g., "ebay.com"). This is achieved by downgrading the domain attribute of the main document (e.g., "www.ebay.com" or "buy.ebay.com") to the second level root domain (e.g., "www.ebay.com"). An example is shown at 300 in FIG. 3.

Figure 4:
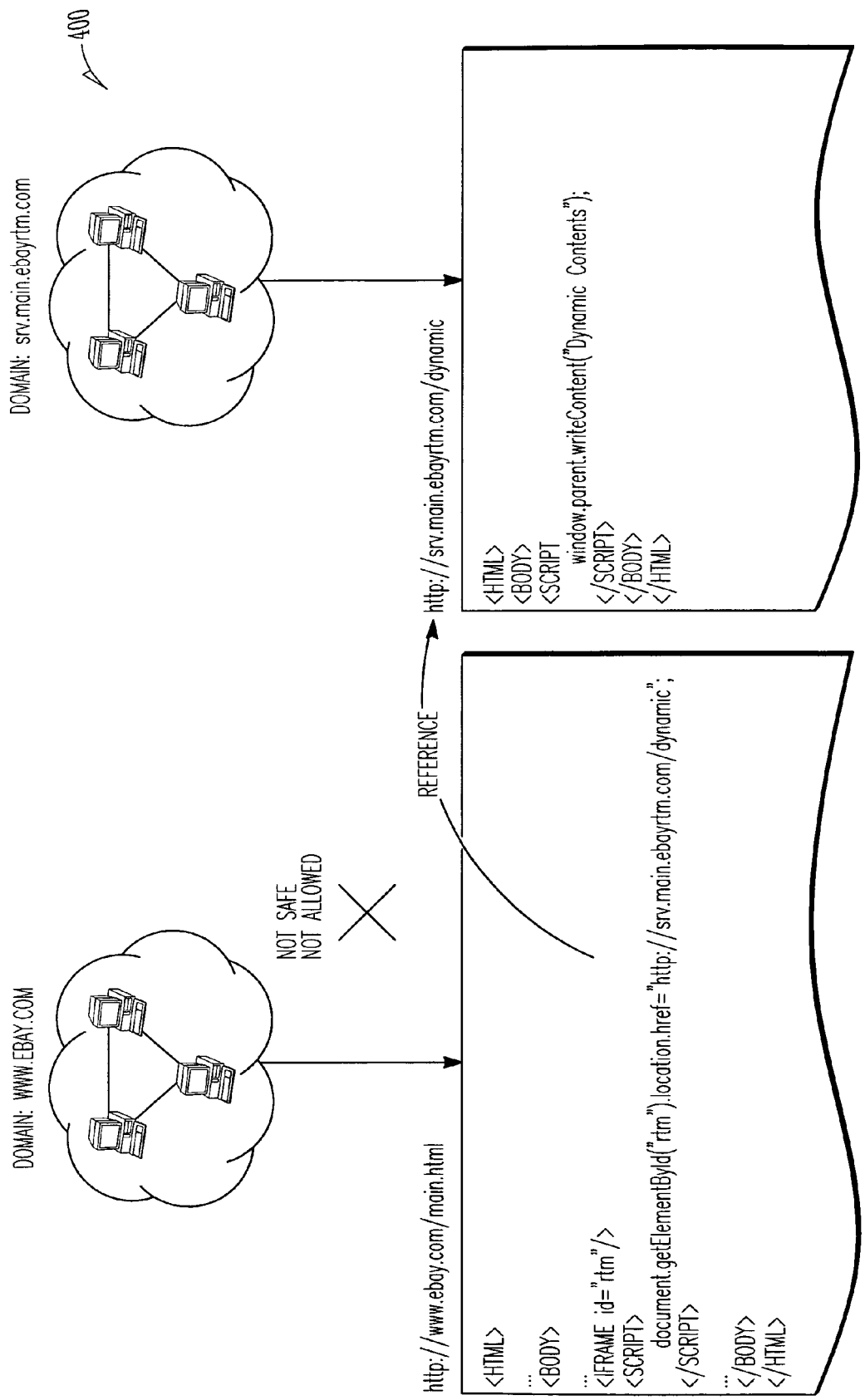
FIG. 4 is a diagrammatic representation of disallowed cross domain access with different second level root domain.

Cross domain access with different second level root domain is not allowed. An example is shown at 400 in FIG. 4. In this case, the location.href (URL) attribute is set for the iframe element to a different second level domain from the URL of the first, or main, document. In this example, the location.href is set to *.ebayrtm.com and the first, or main, document is on *.ebay.com. In this case, the second, or sub, document loaded from one second-level root domain (e.g. ebayrtm.com) is not allowed to make any modification to the rendition of the first, or main document when that document was loaded from another second-level root domain (e.g. ebay.com).

One example embodiment may be implemented as a modification to Internet technology (e.g., the AJAX technology) that allows a document compositing device, such as a web browser running on a computer, to load dynamically generated content asynchronously from multiple domains and safely to combine them together to form the rendition, such as, for example, the visible display of a web page.

In one example embodiment, there is provided a modification to AJAX technology that allows loading of executable script, code or program (e.g. JavaScript) asynchronously from multiple domains, this executable script code or program having the capability to modify the main document, even when those domains do not share a common second-level root domain. In the example embodiment, this is achieved by including in the main document, instructions operable to cause a document compositing device to create a second document object in memory, such as, for example, a hidden inline frame (or "iframe") that does not have its source identifier (e.g., src attribute) set. Further details regarding an iframe are provided below. Once the second document object, such as the iframe is created, the script loading logic (which in some embodiments is written in JavaScript) may be dynamically written into the iframe. In this matter, an embodiment enables both cross domain scripting and asynchronously loading of executable content. The scripts loaded from multiple domains can modify the main document directly.

An example embodiment enables safe, asynchronous access of dynamic content across multiple second level root domains.

Figure 5:
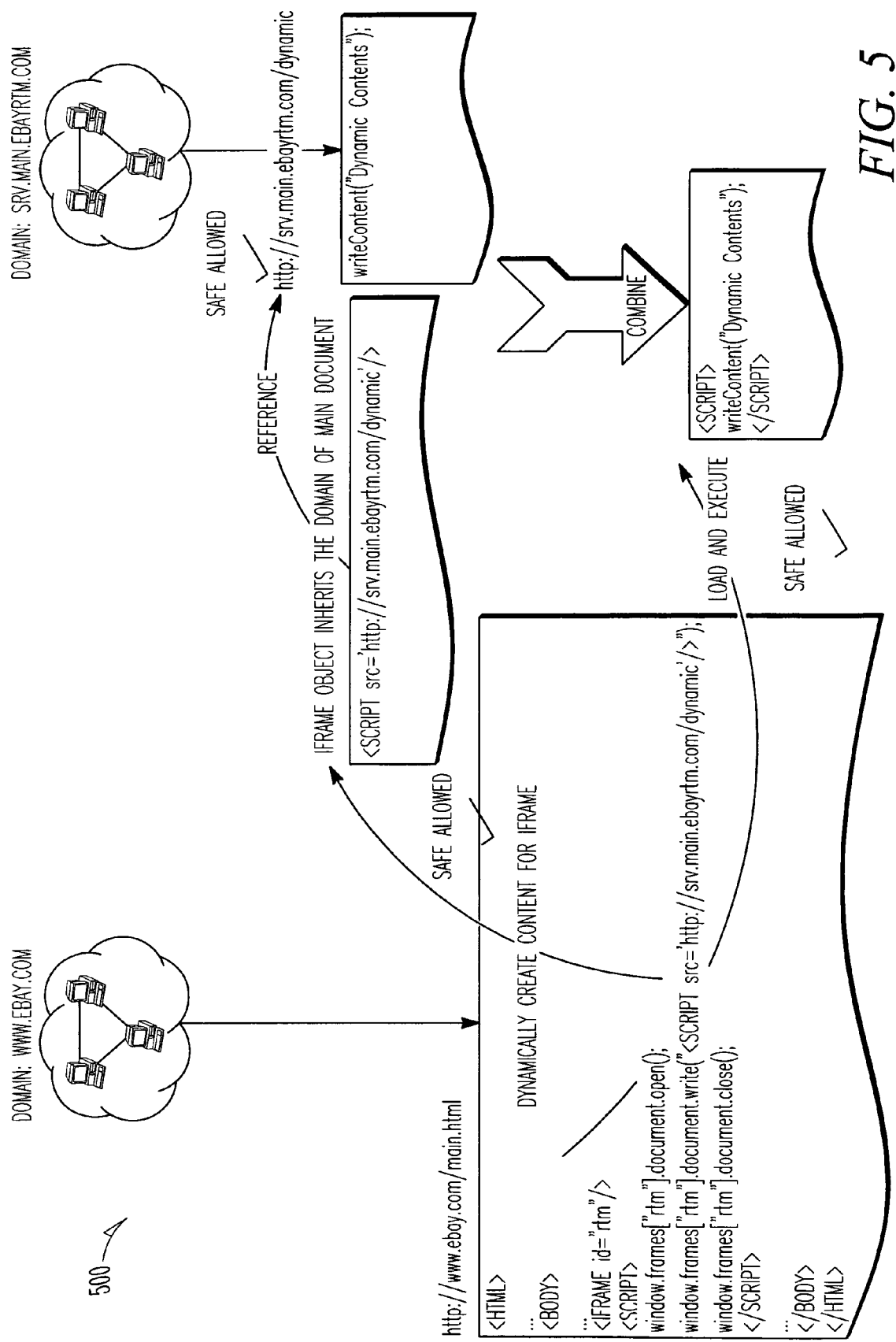
FIG. 5 is a diagrammatic representation of script loading logic written inside the iframe object, which in turn triggers loading of the script from a different domain.

The first operation may be to wrap dynamically generated contents within an executable script, such as Javascript. An iframe element is then inserted into the main document. The iframe is used to load the dynamic content. However, the standard "location.href" attribute is not used to set the source of the iframe, and instead, the document object attached with the iframe is accessed, and written to directly. The script loading logic is written inside the iframe object, which in turn triggers loading of the script from a different domain. An example of this scheme is shown at 500 in FIG. 5. Once the dynamically generated content is loaded, the proper place of the main document is set. Since the dynamic content can be loaded asynchronously, there may be a need to co-ordinate the rendering of the main document.

The above-described approach may, in one example embodiment, be considered safe because a piece of script is loaded, instead of HTML/XML content from multiple root domains. Cross domain loading of script may be considered safe.

Figure 6:
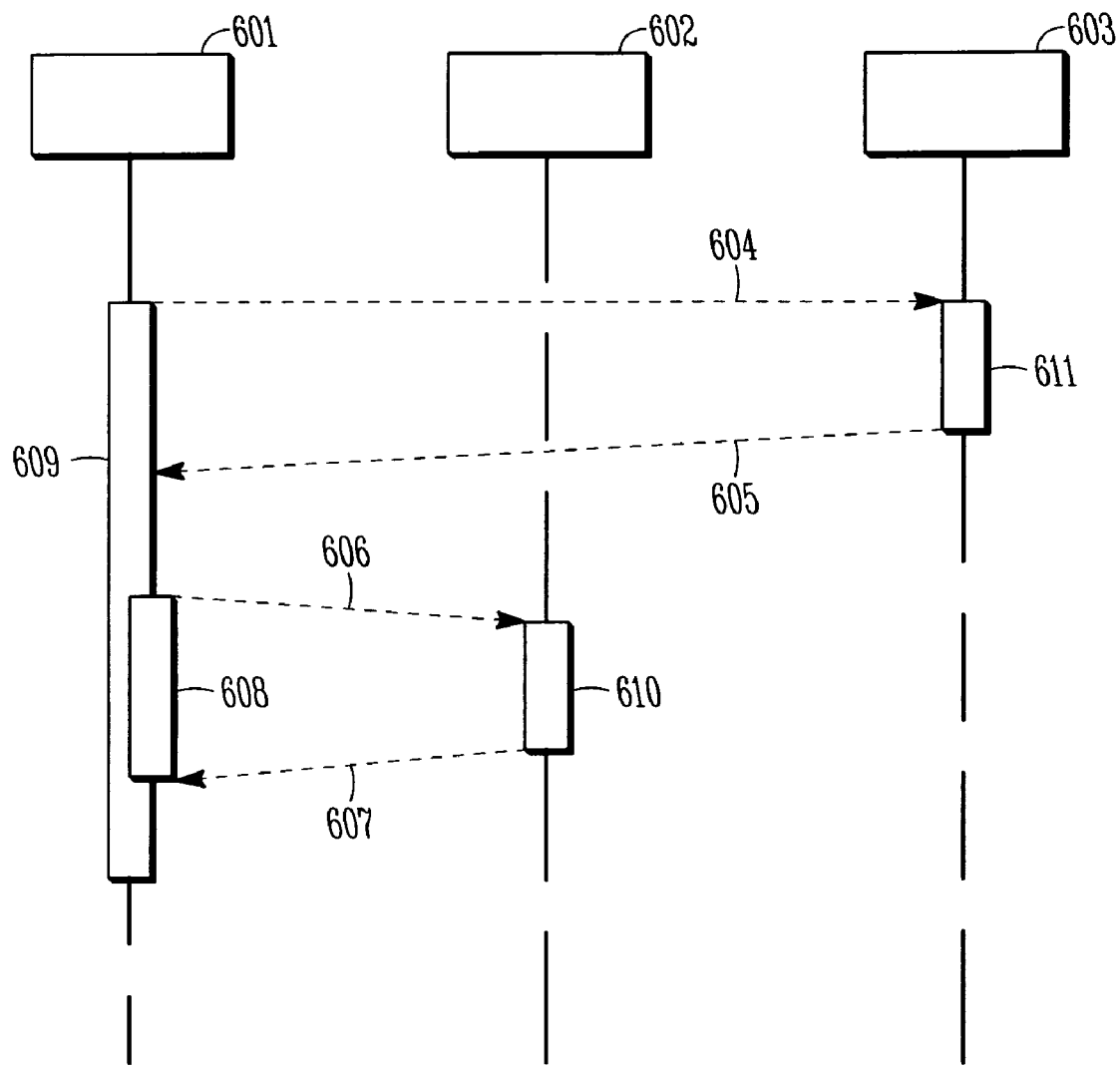
FIG. 6 is a sequence diagram illustrating asynchronous loading of content across multiple internet domains, according to an example embodiment.
Figure 7:
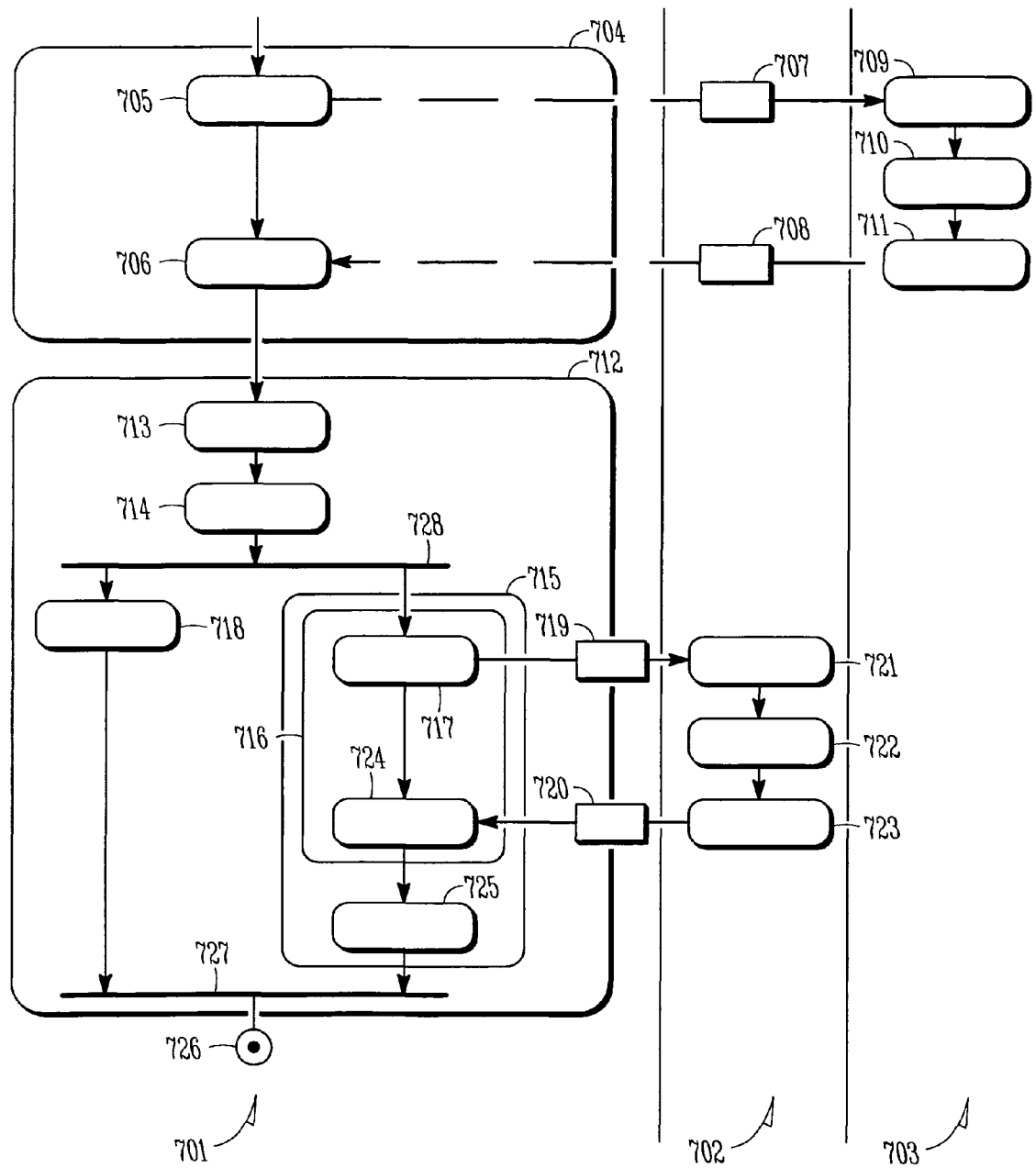
FIG. 7 is an activity diagram illustrating a general process for asynchronous compositing of a web page from content from multiple internet domains, according to an example embodiment.

In the following paragraphs there is provided an example embodiment with reference FIG. 6 and FIG. 7. FIG. 6 shows a sequence diagram illustrating asynchronous loading of content across multiple internet domains, according to an example embodiment. FIG. 7 shows an activity diagram, similar to a flowchart, illustrating a general process for asynchronous compositing of a web page from content from multiple internet domains, according to an example embodiment.

For the purposes of this specification, the term "rendering" shall be taken to mean the process by which a representation (e.g., a document object) of a document is generated.

Merely for example, the document may be written in a markup language, including in some cases, executable program code embedded within it, in order to produce an internal representation that describes the content of a visible manifestation in such detail as to allow with limited further processing the presentation of an actual visible manifestation of that content on a computer display device, or the provision of a data object as input to another computer implemented method where the data object is formatted according to a page description language type format and the data object describes a visible manifestation of that content. In one embodiment, once all processing that can be done with respect to the markup language document has been completed, then it may be said that a final rendition has been produced. The component (which, in some examples, may be implemented in software) within a document compositing device that carries out the rendering may be called a rendering engine. The presentation of an actual visible manifestation of the rendition on a computer display device may be defined as displaying the rendition, whereupon the user, in observing that manifestation may be said to be viewing the rendition. Viewing the rendition may also include examining the rendition using a debugger to examine the operation of the document compositing device.

In particular, note that in many web browsers, when the content of the rendition changes, the visible manifestation of the rendition as shown on the computer display device is changed to reflect the new content of the rendition. An example of this is often seen in the context of web browsers rendering web pages that include images. The rendition initially contains only the position and size of the image and thus the rendition is depicted on the display screen with a box at the location of the image. Later, the image is loaded into the browser and becomes rendered into the rendition, and the on-screen depiction updates to show the image. In some cases, web browsers will logically separate the function of the rendering engine from the function of a module that causes the rendition to be displayed on the display screen.

Referring first to FIG. 6, there is shown a sequence diagram illustrating activations and temporal communication relationships of components of the system, according to an example embodiment, in which the flow of time is toward the bottom of the figure. Component 601 and its dependent vertical artifact, represents a document compositing device, such as a web browser, with component 602 and its dependent vertical artifact representing a script server, and component 603 and its dependent vertical artifact representing a main document server. Likewise, swimlanes 701, 702, and 703 in FIG. 7 contain operations carried out by the document compositing device, script server, and first document server, respectively. The document compositing device will in some embodiments include a computer or other computation device on which software capable of receiving markup language documents and creating renditions of them is executing. In some embodiments, this document compositing device includes a rendering engine (illustrated at 802 in FIG. 8), able to receive one or more markup language documents (in some embodiments, via a communication module at 801 in FIG. 8) and in response, create renditions of the documents' content. In some embodiments, the document compositing device (such as, for example, a web browser running on a computer) includes the ability to display a visible representation of the rendition to an end user on an output device, such as a computer screen, cell phone screen, personal digital assistant, or the like, which in some embodiments may be accomplished by a display module illustrated in FIG. 8 as 803. In these embodiments, the document compositing device can be considered a document viewing device. In some other embodiments, the document compositing device does not have a built-in capability to display an image of the rendition on a screen but will rather prepare a data object representing its visible manifestation (in some cases using a page description language) suitable as the input to some other device or computer-implemented process. In some embodiments two or more of these components may be running on the same physical computing machine. In one example embodiment, the document compositing device can begin active processing, in response to, for example, a user entering a web address into its user interface, the period of active processing identified by stripe 609.

Upon beginning active processing, the document compositing device can load 704 a first document from the first document server located in a first document domain. For example, an end user may wish to view an image representing a rendition of this first document. To load the first document, the document compositing device can transmit 705 request 707 (resp. 604) (such as, for example, via HTTP) to the first document server for a first document. In response to the reception 709 of this request, the first document server may begin a period of active execution 611 which can include generating a first document 710 and transmitting 711 a response 708 (resp. 605) including the first document, to the document compositing device. This first document may be written in a page descriptor markup language, for example, HTML or XHTML, and may include executable source code in a scripting language understood by the document compositing device, such as JavaScript, Jscript or VBScript.

Generating the document may be implemented in several ways. For example, the generation may be simple in the sense that the document already exists on a mass storage device such as a hard drive or a memory and merely needs to be retrieved therefrom and transmitted to the document compositing device. In other examples, the document may be generated by a program running on the first document server, or generated by a program acting to use a stored template and modifying it to produce the document.

In some examples, the transmitted request for the first document contains other data that the main document server took into account in determining precisely the document generated. For example, the end user may fill out some type of web-based form on the document compositing device and the content of the fields may be transmitted along with the request for the first document—the content of those fields influencing the generated document.

In other examples, the first document server may query the document compositing device for "cookies" or other information accessible via the document compositing device and use this information in the generation of the first document. One of skill in the art of web programming will appreciate that there are other methods by which the first documents server may generate the first document.

The first document, in an example embodiment, may include two provisions. First, it may include a first instruction by which the document compositing device, in the process of rendering it, will create a second document object (in some examples, a subdocument or child document) within its memory. This second document object may in some embodiments be a literal markup language document which may be editable under control of a program or script executable by the document compositing device. In other embodiments, the second document object may be a data structure capable of being manipulated by a program or script executable by a document compositing device as if it were, in fact, markup language document. Second, it may include a second instruction, which, when executed, writes instructions or logic into the second document object, the logic being operative to load a script from a script server, as described below.

Having received 706 the first document, the document compositing device may commence rendering it at 712 (e.g., to create a rendition of the document) by executing the various markup instructions and executable script instructions therein. In the process of rendering the first document, the document compositing device may execute the instruction that creates the second document object in memory at 713, and the instruction operable to write the script loading logic into the second document object at 714. It should be noted, in some embodiments or in certain scripting languages, that these instructions may not be atomic, and may consist of multiple sub-instructions that when executed in order, effect the desired results. Similarly, the script loading logic that can be written by the second instruction may be in some way composite, in that the entire script loading logic may require more than a single atomic instruction or sequence of characters to be written in a well-formed manner into the second document object.

Figure 8:
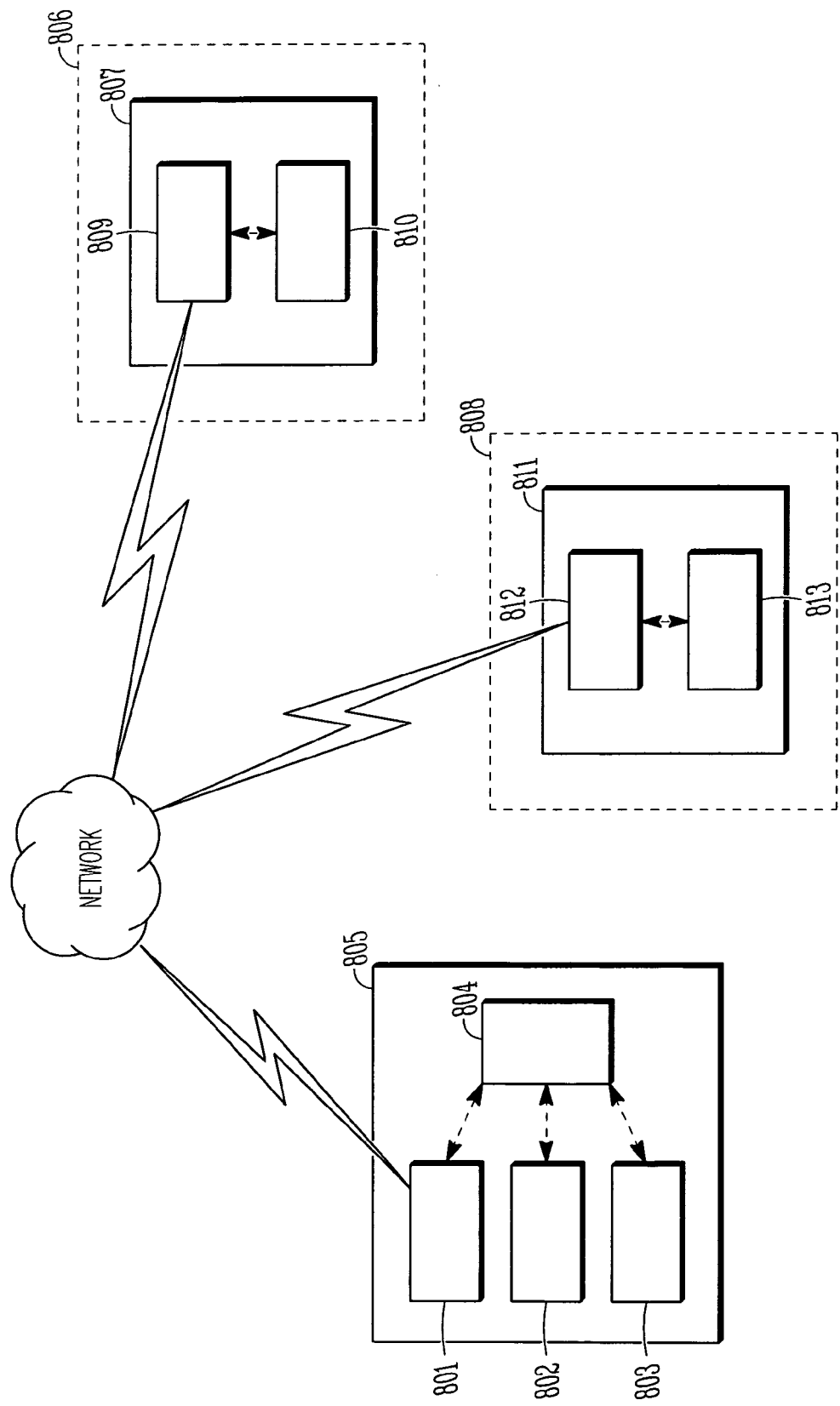
FIG. 8 is a diagrammatic representation of various systems described herein, according to an example embodiment.

Once the second document object contains the script loading logic, the document compositing device attempts to render it at 715. In the case of the second document object, this rendering process may not produce a rendition that has a visible manifestation, since the second document object (sometimes a subdocument) can in some embodiments be a hidden inline frame. Instead, the rendering of the second document object is effective to cause the document compositing device to execute the script loading logic at 716. The rendering of the second document object may occur in parallel or asynchronously with the rendering process of the first or main document. This asynchronicity can be achieved by running the rendering of the second document object as a separate process or thread of execution from the rendering of the remainder of first document at 718, as indicated by the split in execution thread (or "fork") at 728. In some embodiments, this parallelism can be achieved by running the separate processes or threads on separate hardware. This parallel execution is indicated in FIG. 8 with a second activation 608 associated with the document compositing device 601.

In response to the execution of the script loading logic, the document compositing device transmits 717 a message 719 (resp. 606) via a network to a script server located within a script serving domain. As the script loading logic may include an HTTP address, the machine corresponding to that address is contacted in an attempt to download an executable script and may be considered a script server. The script server may receive the message at 721, generate a suitable script 722, and transmit the script (which may be in the form of a markup language document containing for example JavaScript, Jscript or VBScript) at 723. These three actions may occur with a single activation 610 of the script server. The script can thus be transmitted as part of a reply message 720 (resp. 607) via a network and received by the document compositing device at 724.

Analogously to the generation of the first document, the generation of the script may be implemented in a variety of ways that will be apparent to one skilled in the art. In some embodiments, a single first document can be used for all users, while the content encapsulated by the script can be generated so as to be customized or specific to the end user or task.

The script (thus loaded from the script serving domain) may encapsulate content to be included in the rendition of the first document. This content may be absent from the first document and thus may need to be supplied by the script as a necessary condition for its inclusion in the final rendition of the first document (e.g., main document). Once the script is received, it is written into the second document object. In some document compositing devices, the actual text of the script is inserted into the second document object. In some other document compositing devices, the script is translated into a machine-executable form and stored in memory in such a way that it can be executed in sequence, after the script loading logic or instructions that caused the script to be requested 717 and received 724.

The script can encapsulate a single piece of content, or multiple pieces of content, intended to be inserted at various locations of the rendition of the first document.

Once loaded, the script can be executed 725 within the execution thread or process that is being used to render the second document object. The execution of the script may be effective to modify the contents of the rendition of the first document, or in some examples, to modify a data structure in the memory of the document compositing device that stores content to be included in the rendition by the process of rendering the first document. Once the script is executed, the rendering of the second document object is considered complete and the thread of execution or press responsible for its rendering is complete and terminates, or in some examples, rejoins 727 the main process or thread of execution that has been rendering the first document. At the end point of the overall rendering process at 726, the rendition of the first document, composited with the content encapsulated in the script, can be substantially complete. Depending on the content of the final rendition (e.g., the final rendition of the first document: the rendition of the first document, including the content encapsulated by the script), some further processing may occur, for example, downloading images or other static content from various location on the Internet. Such further processing may include displaying the final rendition to the end user on some type of display device.

It will be apparent to those skilled in the art that, when dealing with parallel and asynchronous processes, issues of interleaving of instructions from multiple threads of execution can arise and may need to be addressed. In particular, if the creation of the rendition of the main document absent the content encapsulated in the script is substantially finished before any of the script is executed, the rendition can be easily modified by the execution of the script so as to include the script's encapsulated content. On the other hand, if some portion of the script executes before the regions of the rendition of the first document intended to reference or otherwise contain the content encapsulated by that portion are rendered, the content has, in a sense "nowhere to go." Accordingly, provision may need to be made for the successful creation of a rendition no matter what order of instruction interleaving occurs. In the following section, a further example embodiment is described that, in addition to showing examples of a first document and content-encapsulating script, teaches a technique whereby interleaving issues may be obviated.

In some cases it may be advantageous to generate a first document having instructions to create multiple subdocuments, into each of which is written separate script loading logic. In some cases it may be advantageous to further have each separate subdocument send a separate request to separate script servers, possibly located within separate script serving domains, and to execute the various scripts received therefrom.

FIG. 8 illustrates the systems described above, according to an example embodiment. A document compositing device 805 may include a number of components including a communication module 801 that communicates with systems external to the document compositing device In some embodiments, the document compositing device 805 further includes a rendering module or rendering engine 802 capable of rendering documents such as those received by the communication module 801, and a memory 804 in which the communication module 801 and a memory module may store and retrieve documents, scripts, renditions, logic, program instructions and the like. In some embodiments, the document compositing device may include a display module 803 operable to display images of renditions upon a screen or other device for display to a user, as described above.

A first document server or first document serving system 807 may be included within a first document domain 806. In some embodiments, this first document server 807 may include a communication module 809 that may be used to receive a request from a document compositing device 805 to transmit a first document, and in turn to transmit a first document back to the document compositing device 805. In some embodiments, this first document server 807 may include a document generating module 810 operable to generate a first document, as described above.

A script server or script serving system 811 may be included within a script serving domain 808. In some embodiments, the script server 811 may include a communication module 812 that may be used to receive a request from a document compositing device 805 to transmit a script, and in turn to transmit a script back to the document compositing device 805, to enable the document compositing device 805 to modify the content of a rendition produced by the document compositing device 805. In some embodiments, this script server 811 may include a script generating module 813 operable to generate a script, as described above.

In the following paragraphs, an embodiment using this approach is described.

TABLE 1

A first document, according to an example embodiment, that may be retrieved from a first document server located within the ebay.com domain with a web address http://www.ebay.com/main.html is provided below:

```
<!DOCTYPE HTML PUBLIC "-//W3C//DTD HTML 4.0 Transitional//EN">
<html>
    <head>
        <title></title>
    <script language=javascript>
<!--
function Placement(id, content){
    this.id = id;
    this.content = content;
}
function findPlacement(p){
    for(i=0;i<placementRegistry.length;i++){
        if(placementRegistry[i].id == p){
            return placementRegistry[i];
        }
    }
}
function setContentToRegistry(p, content){
    var found = findPlacement(p);
    if(found){
        found.content = content;
        var element = document.getElementById(p);
        if(element){
            element.innerHTML = found.content;
        }
    }
}
function loadContentFromRegistry(p){
    var found = findPlacement(p);
    if(found){
        var content = found.content;
        var element = document.getElementById(p);
        if(content && element){
            element.innerHTML = content;
        }
    }
}
var placementRegistry = new Array;
placementRegistry[0] = new Placement("placement1", null);
placementRegistry[1] = new Placement("placement2", null);
placementRegistry[2] = new Placement("placement3", null);
rtm_call = '<scr'+'ipt
src="http://srv.main.ebayrtm.com/rtm_test/prototype2/rtm_call.js.file"
language=javascript></scr'+'ipt>';
//-->
</script>
    </head>
    <body>
    <iframe name="rtm" id="rtm" height="1" width="1"></iframe>
    <script>
    window.frames["rtm"].document.open( );
    window.frames["rtm"].document.write(rtm_call);
    window.frames["rtm"].document.close( );
    </script>
    Placement 1:
    <div id = "placement1">
        <script language=javascript>
        <!--
            loadContentFromRegistry("placement1");
        //-->
        </script>
    </div>
    Placement 2:
    <div id = "placement2">
        <script language=javascript>
```

TABLE 1-continued

A first document, according to an example embodiment, that may be retrieved
from a first document server located within the ebay.com domain with
a web address http://www.ebay.com/main.html is provided below:

```
        <!--
            loadContentFromRegistry("placement2");
        //-->
        </script>
    </div>
    Placement 3:
    <div id = "placement3">
        <script language=javascript>
        <!--
            loadContentFromRegistry("placement3");
        //-->
        </script>
    </div>
    </body>
</html>
```

TABLE 2

A, script according to an example embodiment, which may be
retrieved from a script server located within the ebayrtm.com domain with
a web address http://srv.main.ebayrtm.com/dynamic is provided below.

Window.parent.setContentToRegistry("placement1", "Hello 1");
window.parent.setContentToRegistry("placement2", "Hello 2");
window.parent.setContentToRegistry("placement3", "Hello 3");

Note that in this example the script serving domain has a different second level root domain ("ebayrtm.com") from the first document domain ("ebay.com"). In some embodiments the second level root domains may be the same.

Table 1 represents a first or main document as it may be transmitted from a first document server to a document compositing device, according to an example embodiment. It can be seen that this example document is written in HTML supplemented with executable JavaScript code. The document begins by defining a number of JavaScript functions and variables in the <head> portion of the document, followed by the <body> portion of the document. The body, in this example, contains 3 divisions, set out by <div> tags. It is within these divisions that content encapsulated by the script of Table 2 may be eventually placed in the final rendition of the first document. These divisions in the first document have identifiers (e.g., id="placement3") but no content that is displayed in a rendition of the first document absent its modification by the script. For further details on the syntax and semantics of the markup language used in these tables, reference may be had to any of numerous references on the subjects of HTML, XHTML, Cascading Style Sheets, JavaScript, or web programming in general.

The document compositing device, upon reception of the first document from the first document server, may begin rendering it. With reference to Table 1, this rendering process may include the following operations: (1) the functions "Placement", "findPlacement", "setContentToRegistry" and "loadContentFromRegistry" may be compiled into some machine-executable form, (2) the "placementRegistry" array may be allocated in memory and filled with null values ("placementRegistry[0]=new Placement("placement1", null)"), (3) a text string constant (here called "rtm_call") may be created, this text string containing script loading logic, (4) a second document object may be created in memory, in this example, an inline frame (in response to the processing of the "<iframe name="rtm" id="rtm" . . . <</iframe>" instruction), (5) the composite instruction to write the text string "rtm_ call" into the second document object may be executed, the composite instruction including, in this example, the operations of opening the second document object for writing, writing the script loading logic-containing string into it, and closing it, and (6) the remainder of the first document may be rendered, including the div regions. Note that, in this example, the inline frame tag that is effective to create the second or subdocument does not have its source attribute set, nor does it include any script instructions—it is essentially empty with respect to its initial content. Note also in this example that the script loading logic is a script tag and includes the web address (http://srv.main.ebayrtm.com/ . . . ") of the script serving domain.

In order to understand how the content encapsulated in the script of Table 2 ("Hello 1", etc.) are inserted into the final rendition and in particular in the corresponding div regions, it is necessary to examine the JavaScript functions in the head section of the first document. These functions operate with respect to the 3 div sections of the body of the document and the corresponding 3 entries in the "placementRegistry" array (hereinafter "registry", which operates a lookup mechanism for storing key/value pairs). Observe that the key by which the ith item in the registry is retrieved (e.g. 'placement2') is the same as the corresponding div section's id. Function "Placement(id,content)" serves to create a data structure according to its arguments suitable for storage in the registry. Function "findPlacement(id)" returns the data structure stored in the array that corresponds to its 'id' argument. Function "setContentToRegistry(p,content)" attempts to retrieve the data structure from the registry with the key 'p' and if successful, places the 'content' string into that data structure. In addition, setContentToRegistry attempts to access the element (i.e., the div section of the document) whose id is 'p' and modify its content so as to cause the 'content' to be written into the part of the rendition corresponding to the element. This content modification, however, can only occur if the document compositing device's rendering engine has already rendered the div section whose id is 'p'. It will be apparent that the if(found) guard in the setContentToRegistry function may not be necessary. Its presence does assure the function does not fail in case this function is called with a key that does not exist in the registry, which may conceivably occur due to programmer error.

Function 'loadContentFromRegistry(p)' attempts to retrieve the data structure from the registry with the key 'p' and if successful, retrieves the corresponding 'content' string from the registry and the corresponding 'element' reference to the corresponding div section in the rendition of the first document. If both of these are not null (e.g., the data structure associated in the registry with key 'p' has actual content rather than its initial null value and the rendition has been rendered enough that the div element corresponding to key 'p' is present), the region of the rendition corresponding to the div section corresponding to key 'p' is modified to include the 'content' from the registry.

From these descriptions of the operations of the JavaScript functions included in the first or main document will be apparent how the final rendition of the first document and including the content encapsulated in the script may be created, regardless of the interleaving between the rendering of the first or main document and the rendering of (including executing the script loaded into) the second or subdocument. To motivate this discussion and without loss of generality, consider the example main document of Table 1 and the content-encapsulating script of Table 2, with the simplifying assumption that only one div section is present in the main document and only one setContentToRegistry call occurs in the script, (e.g. keyed by the "placement1" key.). It is useful to consider two example cases.

In the first case, assume that the rendering of the second document object completes before the div section of the first document is rendered. In that case, the script calls setContentToregistry upon the first document and thereby places the string "Hello 1" into the registry to correspond to the "placement1" key. Since the corresponding div section is not yet rendered, the if(element) condition in setContentToRegistry invocation fails, the call completes and the rendering of the second document object is finished. But eventually, the thread or process rendering the first document will reach the div section of the first document and attempt to render it. At this point, the rendering engine will invoke the loadContentFromRegistry function with the id (e.g., "placement1") of the div section it is in the process of rendering, and (since the div section will at this time be rendered and the "Hello 1" string will already be stored in the registry), the part of the final rendition corresponding to the div section will contain the string "Hello 1"

In the second case, assume that the rendition of the second document object does not complete before the div section of the first document is rendered. In that case, the thread or process rendering the first document will reach the div section of the first document and attempt to render it. At this point the rendering engine will invoke the loadContentFromRegistry function with the id (e.g., "placement1") of the div section it is in the process of rendering. But since the second document object has not yet completed rendering, there is no guarantee that the loadContentFromRegistry function will find the suitable "Hello 1" string in the registry and thus may well return without modifying the rendition of the first document. Eventually, though, the process of rendering the second document object will invoke the setContentToRegistry function with arguments "placement 1" and "Hello 1", and thereby not only enter the "Hello 1" string into the registry to correspond to the 'placement 1" key, but also, since document.getElementById ("placement1") will by this time return a non-null reference to the div section of the rendition of the first document, the first document will be modified to insert "Hello 1" into the div section.

It will be clear from the above description that constructing the first document and content-encapsulating script in the manner of Table 1 and Table 2 allows a document compositing device to produce a complete final rendition regardless of the complexity of the first document or the vicissitudes of interleaving between the instructions rendering the first document and the second document object.

It will also be apparent that the techniques described above, although illustrated with an example embodiment in which texts encapsulated in a script are inserted into the rendering of a first document, are applicable to a numerous types of content. In some embodiments, content such as, for example, images, sound clips, video, applets, etc., may be encapsulated into a content-encapsulating script and thereby inserted into a rendition of a first, or main, document. There are no restrictions on the amount of modification of the rendition of the first document possible; in some embodiments the entire rendition of the first document may be altered or replaced according to the content encapsulated in the script. It will further be apparent that modification of the main document by the content of content-encapsulating script is not limited to addition of content to a rendition of the first document, but that modification can also include deletion of content that in the absence of the script would otherwise be included in the rendition of the first document. While the examples above have exemplified an embodiment in which a single content-encapsulating script is used, embodiments in which multiple scripts may be loaded and may modify the rendition of a first document are possible. Finally, it will be apparent that the techniques described above, such as exemplified by the example of Table 1 and Table 2, may be combined with other techniques such as those illustrated in FIG. 1, 2 or 3. For example, a main document located at www.ebay.com could be configured to load two sub documents: one from cgi.ebay.com, the other from www-.shopping.com. To do this, the main document may include instructions to embody both the technique described above with respect to Table 1 and Table 2 and the technique shown in FIG. 3.

In one example embodiment this may be achieved by not having the source identifier set for the iFrame that loads dynamic content from www.shopping.com. When the source identifier is not set, the iFrame will inherit the URL from the main document. In our example, the iFrame for loading www.shopping.com may have the URL www.ebay.com. If the main document domain is downgraded to ebay.com, there is a need to downgrade the domain of the iFrame that loads content from www.shopping.com from www.ebay.com to ebay.com as well. This may be achieved by writing a piece of script into the iFrame to download its domain.

Further information regarding the syntax for an iframe is provided below:

IFRAME - Inline Frame
Syntax       <IFRAME>...</IFRAME>
Attribute Specifications SRC=URI (URI of frame content)
NAME=CDATA (name of frame)
LONGDESC=URI (link to long description)
WIDTH=Length (frame width)
HEIGHT=Length (frame height)
ALIGN=[top|middle|bottom|left|right] (frame alignment)
FRAMEBORDER=[1|0] (frame border)
MARGINWIDTH=Pixels (margin width)
MARGINHEIGHT=Pixels (margin height)
SCROLLING=[yes|no|auto] (ability to scroll)
Core attributes The IFRAME element defines an inline frame for the inclusion of external objects including other HTML documents. IFRAME provides a subset of the functionality of OBJECT; an advantage to IFRAME is that an inline frame can act as a target for other links. OBJECT is more widely supported than IFRAME, and, unlike IFRAME, OBJECT is included in HTML 4.0 Strict.

IFRAME's SRC attribute provides the location of the frame content—which may be an HTML document. The optional NAME attribute specifies the name of the inline frame, allowing links to target the frame.

The content of the IFRAME element is used as an alternative for browsers that are not configured to show or do not support inline frames. The content may consist of inline or block-level elements, though any block-level elements must be allowed inside the containing element of IFRAME. For example, an IFRAME within an H1 cannot contain an H2, but an IFRAME within a DIV can contain any block-level elements.

The LONGDESC attribute gives the URI of a long description of the frame's contents. This is particularly useful for full descriptions of embedded objects. Note that LONGDESC describes the frame content while the content of the IFRAME element acts as a replacement when the external resource cannot be inlined.

An example follows:

```
<IFRAME SRC="recipe.html" TITLE="The Famous Recipe">
<!-- Alternate content for non-supporting browsers -->
<H2>The Famous Recipe</H2>
<H3>Ingredients</H3>
...
</IFRAME>
```

The WIDTH and HEIGHT attributes specify the dimensions of the inline frame in pixels or as a percentage of the available space. The FRAMEBORDER attribute specifies whether or not a border should be drawn. The default value of 1 results in a border while a value of 0 suppresses the border. Style sheets allow greater flexibility in suggesting the border presentation.

Figure 9:
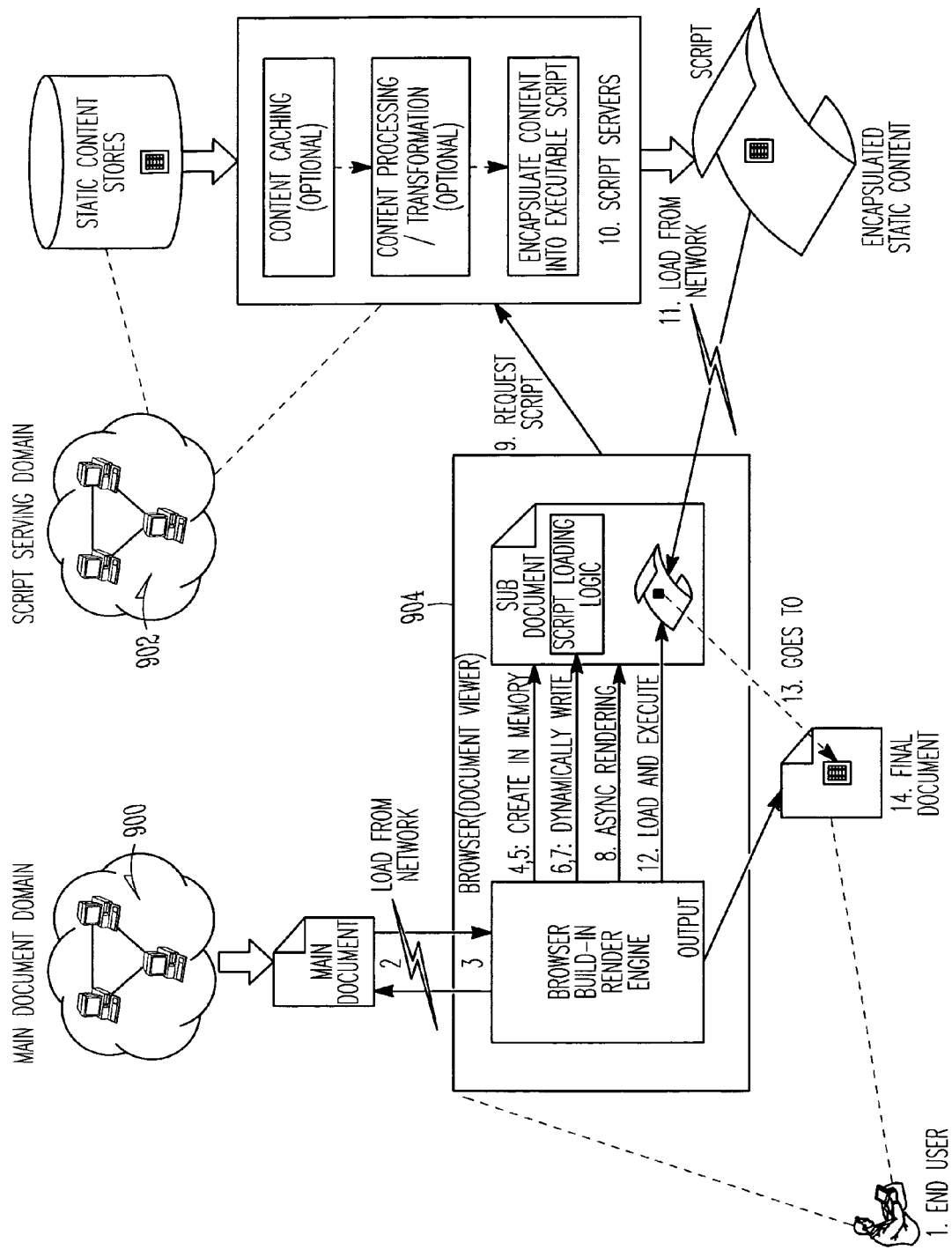
FIG. 9 diagrammatic representation of three example systems connected by a network, a first system is the first or main document server on the main document serving domain, a second system is the script server on the script serving domain, and a third system is the document compositing device, such as, for example, a document viewing device used by a human user to view document loaded from the network.

FIG. 9 shows three systems, according to an example embodiment, connected by a network. The first system 900 is the first or main document server on the main document serving domain. The second system 902 is the script server on the script serving domain. The third system 904 is the document compositing device, such as, for example, a document viewing device used by a human user to view document loaded from the network.

A document compositing device may contain document viewing software. This document viewing software is capable of creating renditions by rendering document loaded from the network, executing script synchronously, and dynamically creating and writing to a second document object, for example, a sub document object. The software is also capable of rendering multiple documents asynchronously. FIG. 6 exemplifies how, capabilities provided by the document compositing device may be leveraged to asynchronously load documents and scripts from multiple network domains and combine them together for, in some embodiments, presentation to the end user.

In an example embodiment, the operations are as follows:
1. End user, via the document compositing device, sends a request to the document compositing device, such as, for example, a document viewing device to view the main document.
2. Document viewing device loads the main document from the main document domain, in some embodiments from a main document server located within that domain.
3. The rendering engine inside the document viewing device starts rendering the main document.
4. As part of the main document, there is an instruction to dynamically create a second document object (for example, a sub document) in the memory of the document compositing device.
5. The rendering engine inside the document viewing device creates a sub document in memory.
6. As part of the main document, there is an instruction to write script loading logic into the sub document.
7. The rendering engine inside the document viewing device writes script loading logic into the sub document
8. The rendering engine executes the script loading logic in parallel with rendering of the main document. In various example embodiments, this parallel execution may be done via multithreading, or by actual multiprocessing, depending on how the rendering engine is implemented.
9. While executing the script loading logic, the document viewing device sends a request to load a script from the script serving domain, in some embodiments from a script server located within that domain
10. The script server responds by transmitting or serving a piece of content encapsulated in a script to the document viewing device.
11. The document viewing device receives the script that contains static content
12. The rendering engine inside the document viewing device executes the script loaded from the script serving domain
13. The script alters the rendition of the main document being created by the rendering engine by setting the content that the script encapsulates into the rendition of the main document.
14. The document rendering engine thus combines the main document with the content loaded from the script serving domain into a rendition and, in some embodiments, shows the rendition to the end user.

Figure 10:
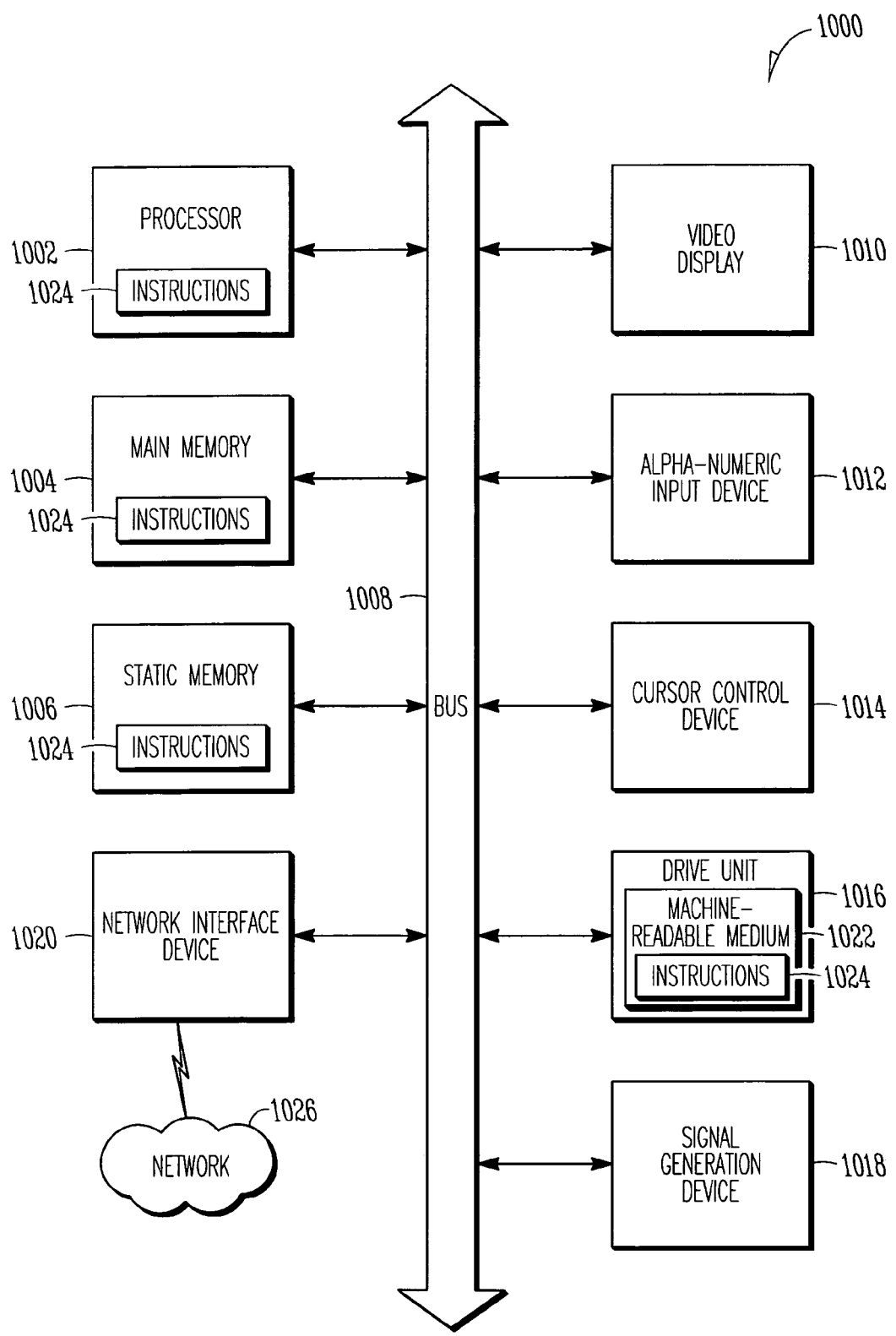
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines.

In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 208. The computer system 200 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 214 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present application has been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

What is claimed is:

1. A method of asynchronously rendering dynamically created content across multiple network domains, the method comprising:
    loading a first document from a first document domain, the first document including a first instruction to dynamically create a second document object and a second instruction to write script loading logic into the second document object; and
    rendering the first document to create a rendition, the rendering including:
        creating the second document object according to the first instruction;
        writing, into the second document object, the script loading logic according to the second instruction; and
        asynchronously rendering the second document object,
    wherein the second instruction includes a web address of a script serving domain, and wherein the script serving domain and the first document domain have different second level root domains.

2. The method of claim 1, wherein asynchronously rendering the second document object comprises:
    executing the script loading logic to send a script loading request to a script serving domain and to receive a script from the script serving domain, the script executable to modify the content of the rendition; and
    executing the script to modify the content of the rendition.

3. The method of claim 1, wherein rendering the first document and asynchronously rendering the second document object occur in parallel.

4. The method of claim 1, wherein the first document is a main document and the second document object is a subdocument.

5. The method of claim 1, wherein the script loading logic is a script tag.

6. The method of claim 1, wherein the script serving domain and the first document domain have a common second level root domain.

7. A method of asynchronously compositing a web page from content from multiple internet domains, the method comprising:
    receiving, from a document compositing device, a request to transmit a first document from a first document domain;
    generating the first document to include a first instruction to dynamically create a second document object, the first instruction including an inline frame tag, and a second instruction to write script loading logic into the second document object; and
    transmitting the first document to the document compositing device,
    wherein the script loading logic is executable by the document compositing device to send a script loading request to a script serving domain, and wherein the script serving domain and the first document domain have different second level root domains.

8. The method of claim 7, wherein the script loading logic is executable by the document compositing device to receive a script from the script serving domain, the script executable to modify the content of a rendition of the first document.

9. The method of claim 8, wherein the script serving domain and the first document domain have a common second level root domain.

10. The method of claim 7, wherein the script loading logic is a script tag.

11. The method of claim 7, wherein the second instruction includes a web address of the script serving domain.

12. A system including:
    one or more processors;
    a communication module executed by the one or more processors to load a first document from a first document domain, the first document including a first instruction to dynamically create a second document object, the first instruction including an inline frame tag, and a second instruction to write script loading logic into the second document, to send a script loading request to a script serving domain, and to receive a script from the script serving domain, the script executable to modify the content of a rendition of the first document, wherein the script serving domain and the first document domain have different second level root domains; and
    a rendering engine executed by the one or more processors to render the first document to create a rendition.

13. he system of claim 12, wherein the rendering engine is to render the first document to create the rendition, including to create, in a memory, the second document according to the first instruction, to write, into the second document object, the script loading logic according to the second instruction;, and to asynchronously render the second document by executing the script loading logic and executing the script to modify the content of the rendition.

14. A system including:
one or more processors;
a document generating module executed by the one or more processors to generate a first document to include a first instruction to dynamically create a second document object, the first instruction including an inline frame tag, and a second instruction to write script loading logic into the second document object; and
a communication module executed by the one or more processors to receive, from a document compositing device, a request to transmit the first document from a first document domain, and to transmit the first document to the document compositing device,
wherein the second instruction includes a web address of a script serving domain, and wherein the script serving domain and the first document domain have different second level root domains.

15. The system of claim 14, wherein the script loading logic is executable by the document compositing device to send a script loading request to a script serving domain and to receive a script from the script serving domain, the script executable to modify the content of a rendition of the first document.

16. A machine including:
at least one processor programmed to:
receive, from a document compositing device, a request to transmit a first document from a first document domain;
generate the first document to include a first instruction to dynamically create a second document object, the first instruction including an inline frame tag that does not have a source attribute set and does not include a script instruction, and a second instruction to write script loading logic into the second document object; and
transmit the first document to the document compositing device,
wherein the second instruction includes a web address of a script serving domain, and wherein the script serving domain and the first document domain have different second level root domains.

17. The machine of claim 16, wherein the script loading logic is executable by the document compositing device to send a script loading request to a script serving domain and to receive a script from the script serving domain, the script executable to modify the content of a rendition of the first document.

* * * * *

UNITED STATES PATENT AND TRADEMARK OFFICE
CERTIFICATE OF CORRECTION

PATENT NO. : 8,065,610 B2
APPLICATION NO. : 12/397228
DATED : November 22, 2011
INVENTOR(S) : Xu et al.

It is certified that error appears in the above-identified patent and that said Letters Patent is hereby corrected as shown below:

In column 2, line 15, delete "ebay" and insert -- eBay --, therefor.

In column 2, line 18, delete "ebay." and insert -- eBay. --, therefor.

In column 8, line 50, delete "device" and insert -- device. --, therefor.

In column 11, lines 28-30, delete "Note that in this example the script serving domain has a different second level root domain ("ebayrtm.com") from the first document domain ("ebay.com"). In some embodiments the second level root domains may be the same." and insert the same on Col. 11, Line 24, after "below." as a continuation of the Paragraph.

In column 11, line 64, delete "<</iframe>"" and insert -- ></iframe>" --, therefor.

In column 12, line 30, delete "(http:" and insert -- ("http: --, therefor.

In column 13, line 39, delete ""Hello 1"" and insert -- "Hello 1". --, therefor.

In column 13, line 54, delete ""placement 1"" and insert -- "placement1" --, therefor.

In column 13, line 56, delete ""placement 1"" and insert -- "placement1" --, therefor.

In column 16, line 12, delete "document" and insert -- document. --, therefor.

In column 16, line 21, delete "domain" and insert -- domain. --, therefor.

In column 16, line 26, delete "content" and insert -- content. --, therefor.

In column 16, line 29, delete "domain" and insert -- domain. --, therefor.

Signed and Sealed this
Seventh Day of February, 2012

David J. Kappos
*Director of the United States Patent and Trademark Office*

CERTIFICATE OF CORRECTION (continued)
U.S. Pat. No. 8,065,610 B2

In column 18, line 60, in Claim 13, delete "he" and insert -- The --, therefor.

In column 18, line 64, in Claim 13, delete "instruction;," and insert -- instruction, --, therefor.